United States Patent
Conti et al.

(10) Patent No.: US 10,902,092 B2
(45) Date of Patent: Jan. 26, 2021

(54) MONITORING CIRCUIT FOR ALLOWING A PROCESSOR TO ENTER SECURE MODE UPON CONFIRMING PROPER EXECUTION OF A NON-SPECULATIVE INSTRUCTION

(71) Applicant: TEXAS INSTRUMENTS INCORPORATED, Dallas, TX (US)

(72) Inventors: Gregory Remy Philippe Conti, Saint Paul (FR); Jerome Laurent Azema, Villeneuve-Loubet (FR)

(73) Assignee: Texas Instruments Incorporated, Dallas, TX (US)

(*) Notice: Subject to any disclaimer, the term of this patent is extended or adjusted under 35 U.S.C. 154(b) by 407 days.

(21) Appl. No.: 14/596,017

(22) Filed: Jan. 13, 2015

(65) Prior Publication Data

US 2015/0178513 A1  Jun. 25, 2015

Related U.S. Application Data

(62) Division of application No. 10/961,748, filed on Oct. 8, 2004, now Pat. No. 8,966,226.

(30) Foreign Application Priority Data

Jul. 1, 2004  (EP) .................................... 04291677

(51) Int. Cl.
  *G06F 21/00* (2013.01)
  *G06F 9/30* (2018.01)
  (Continued)

(52) U.S. Cl.
  CPC .......... *G06F 21/00* (2013.01); *G06F 9/30076* (2013.01); *G06F 11/28* (2013.01); *G06F 11/3027* (2013.01); *G06F 21/82* (2013.01)

(58) Field of Classification Search
  CPC .. G06F 9/30076; G06F 11/28; G06F 11/3027; G06F 21/00
  See application file for complete search history.

(56) References Cited

U.S. PATENT DOCUMENTS 5,228,131 A * 7/1993 Ueda ..................... G06F 9/3826
                                                712/240
6,094,717 A   7/2000 Merchant et al.
(Continued)

FOREIGN PATENT DOCUMENTS

EP          1331539          7/2003

OTHER PUBLICATIONS

Arm, "ETM9 Technical Reference Manual", Revision r2p2, 2002, 158 pages.*

(Continued)

*Primary Examiner* — David J. Huisman
(74) *Attorney, Agent, or Firm* — Brian D. Graham; Charles A. Brill; Frank D. Cimino

(57) ABSTRACT

A method and system of verifying proper execution of a secure mode entry sequence. At least some of the exemplary embodiments may be a method comprising delivering an instruction from a memory to a processor across an instruction bus (the instruction at least partially configures the processor for secure mode of operation different that privilege modes of the processor), verifying delivery of the instruction across the instruction bus, and checking for proper execution of the instruction using a trace port of the processor.

47 Claims, 2 Drawing Sheets

(51) Int. Cl.
    *G06F 11/30*     (2006.01)
    *G06F 11/28*     (2006.01)
    *G06F 21/82*     (2013.01)

(56) References Cited

U.S. PATENT DOCUMENTS

| | | |
|---|---|---|
| 7,130,951 B1 | 10/2006 | Christie et al. |
| 2003/0140205 A1 | 7/2003 | Dahan et al. |
| 2003/0140245 A1 | 7/2003 | Dahan et al. |
| 2004/0153672 A1 | 8/2004 | Watt et al. |
| 2005/0015592 A1 | 1/2005 | Lin |

OTHER PUBLICATIONS

"Embedded Trace Macrocell", ARM, ETMv1.0 to ETMv3.5 Architecture Specification, 2001, 420 pages.
"ETM7 ", ARM, Rev. 1, Technical Reference Manual, 2001, 110 pages.
"Microcomputer Dictionary", Second Edition, Chalres J.Sippl, 1981, p. 337.
ARM, "Trace Debug Took User Guide, Version 1.2", 2006-2002, 258 pages.

* cited by examiner

MONITORING CIRCUIT FOR ALLOWING A PROCESSOR TO ENTER SECURE MODE UPON CONFIRMING PROPER EXECUTION OF A NON-SPECULATIVE INSTRUCTION

CROSS-REFERENCE TO RELATED APPLICATIONS

This application is a Divisional of application Ser. No. 10/961,748 filed Oct. 8, 2004, now U.S. Pat. No. 8,966,226, which claims priority under 35 USC § 119(a)-(d) of European Application Number 04291677.5, filed on Jul. 1, 2004.

STATEMENT REGARDING FEDERALLY SPONSORED RESEARCH OR DEVELOPMENT

Not applicable.

BACKGROUND OF THE INVENTION

Field of the Invention

Embodiments of the invention are directed to a secure mode operation of system-on-a-chip (SoC) devices. More particularly, the embodiments are directed to ensuring that secure mode entry instructions enter the processor and are executed by the processor.

Description of the Related Art

Mobile electronic devices such as personal digital assistants (PDAs) and digital cellular telephones are increasingly used for electronic commerce (e-commerce) and mobile commerce (m-commerce). The programs that execute on the mobile devices to implement the e-commerce and m-commerce functionality may need to operate in a secure mode to reduce the likelihood of attacks by malicious programs and to protect sensitive data.

For security reasons, most processors provide two levels of operating privilege: a first level of privilege for user programs; and a higher level of privilege for use by the operating system. The higher level of privilege may or may not provide adequate security, however, for m-commerce and e-commerce, given that this higher level relies on proper operation of operating systems with highly publicized vulnerability. In order to address security concerns, some mobile equipment manufacturers implement yet another third level of privilege, or secure mode, that places less reliance on corruptible operating system programs, and more reliance on hardware-based monitoring and control of the secure mode. U.S. Patent Publication No. 2003/0140205, entitled "Secure Mode for Processors Supporting Interrupts," incorporated herein by reference as if reproduced in full below, describes a hardware monitored secure mode for processors.

The '205 publication describes a system-on-a-chip, or "megacell," Implementation where a plurality of logical components are integrated onto a single semiconductor die. Some of the components may comprise a processor, a digital signal processor, shared memory, and a security state machine which monitors various system parameters and controls entry of the megacell into the secure mode. The security state machine may monitor the processor's data and instruction buses, and place the megacell in the secure mode upon the proper execution of a sequence of events. Thereafter, the security state machine ensures that only privileged programs (e.g., within the secure portion of the shared RAM) are accessed by the processor.

The inventors of the present specification have found that, with improvement in processor technology, it may be possible for malicious programs to misdirect or redirect processor execution even after the proper secure instructions have been delivered from the secure RAM and/or ROM to the processor. Thus, there exists a need for methods and related systems to obviate the potential for a malicious program to trick the system into entering a secure mode and yet execute non-secure instructions.

SUMMARY OF SOME OF THE PREFERRED EMBODIMENTS

The problems noted above are addressed in large part by system and related method of verifying proper execution of a secure mode entry sequence instructions. At least some of the exemplary embodiments may be a method comprising delivering an instruction from a memory to a processor across an instruction bus (the instruction at least partially configures the processor for secure mode of operation different that privilege modes of the processor), verifying delivery of the instruction across the Instruction bus, and checking for proper execution of the instruction using a trace port of the processor.

Other exemplary embodiments may be a system comprising a processor having an instruction bus and a trace port (the trace port having an address bus that identifies the most recent instruction the processor attempted to execute and an interface bus that provides data regarding the most recent instruction), a memory coupled to the processor by way of the instruction bus, and a monitoring device coupled to the instruction bus of the processor and to the address and interface buses of the trace port. The monitoring device checks the instruction bus to determine whether a secure mode entry sequence instruction is delivered to the processor, and the monitoring device also checks the address and interface bus of the trace port to verify the secure mode entry sequence instruction is properly executed by the processor.

Yet further exemplary embodiments may be a method comprising delivering an instruction from a memory on a die to a processor core on the die across an Instruction bus (the instruction at least partially configures the processor core for a secure mode of operation), verifying delivery of the instruction across the instruction bus by a monitoring device on the die, and checking for proper execution of the instruction by the monitoring device using a trace port of the processor core.

Yet further exemplary embodiments may be an apparatus comprising a processor core integrated on a die (the processor core having an embedded trace macrocell (ETM) interface), a memory coupled to the processor by way of an Instruction bus (the memory integrated on the die), and a hardware-based state machine coupled to the instruction bus and the ETM interface (the hardware-based state machine integrated on the die). The hardware-based state machine checks the instruction bus to determine whether an Instruction is delivered to the processor, and the hardware-based state machine checks the ETM interface to determine whether the instruction is properly executed by the processor.

BRIEF DESCRIPTION OF THE DRAWINGS

For a detailed description of the preferred embodiments of the Invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "Including" and "comprising" are used in an open-ended fashion, and thus should be interpreted to mean "including, but not limited to . . . ". Also, the term "couple" or "couples" is intended to mean either an Indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
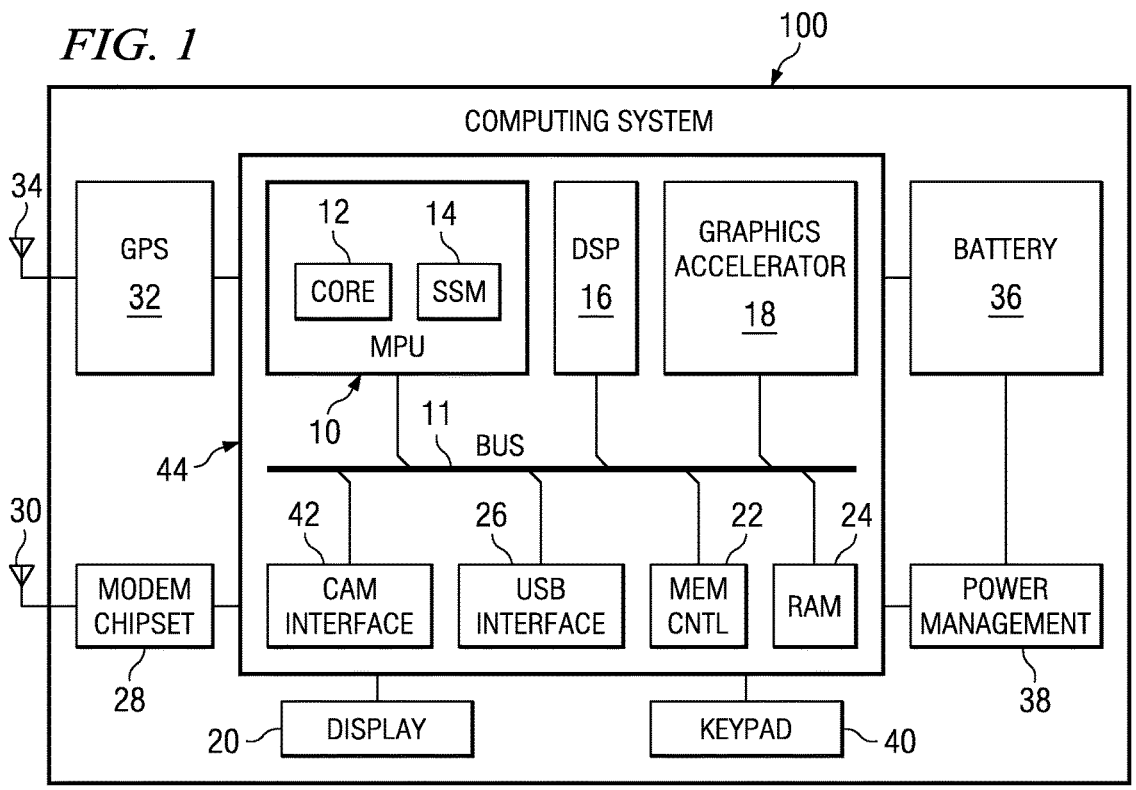
FIG. 1 illustrates a computing system constructed in accordance with at least some embodiments of the invention.

FIG. 1 shows a computing system 100 constructed in accordance with at least some embodiments of the invention. The computing system 100 may comprise a multiprocessing unit (MPU) 10 coupled to various other system components by way of a bus 11. The MPU 10 may comprise a processor core 12 that executes applications, possibly by having a plurality of processing pipelines. The MPU 10 may further comprise a security state machine (SSM) 14 which, as will be more fully discussed below, aids in allowing the computer system 100 to enter a secure mode for execution of secure software, such as m-commerce and e-commerce software.

The computing system 100 may further comprise a digital signal processor (DSP) 16 that aids the MPU 10 by performing task-specific computations, such as graphics manipulation and speech processing. A graphics accelerator 18 may couple both to the MPU 10 and DSP 16 by way of the bus 11. The graphics accelerator 18 may perform necessary computations and translations of information to allow display of Information, such as on display device 20. The computing system 100 may further comprise a memory controller 22 coupled to random access memory (RAM) 24 by way of the bus 11. The memory controller 22 may control access to and from the RAM 24 by any of the other system components such as the MPU 10, the DSP 16 and the graphics accelerator 18. The RAM 24 may be any suitable random access memory, such as synchronous RAM (SRAM) or RAMBUS™-type RAM.

The computing system 100 may further comprise a USB interface 26 coupled to the various system components by way of the bus 11. The USB interface 26 may allow the computing system 100 to couple to and communicate with external devices.

The security state machine 14, preferably a hardware-based state machine, monitors system parameters and allows the secure mode of operation to initiate such that secure programs may execute from and access a portion of the RAM 24. Having this secure mode is valuable for any type of computer system, such as a laptop computer, a desktop computer, or a server in a bank of servers. However, in accordance with at least some embodiments of the invention, the computing system 100 may be a mobile computing system, e.g., a cellular telephone, personal digital assistant (PDA), text messaging system, and/or a computing device that combines the functionality of a messaging system, personal digital assistant and a cellular telephone. Thus, some embodiments may comprise a modem chipset 28 coupled to an external antenna 30 and/or a global positioning system (GPS) circuit 32 likewise coupled to an external antenna 34.

Because the computing system 100 in accordance with at least some embodiments is a mobile device, computing system 100 may also comprise a battery 36 providing power to the various processing elements, possibly controlled by a power management unit 38. A user may input data and/or messages into the computing system 100 by way of the keypad 40. Because many cellular telephones also comprise the capability of taking digital still and video pictures, in some embodiments the computing system 100 may comprise a camera interface 42 which may enable camera functionality, possibly by coupling the computing system 100 to a charge couple device (CCD) array (not shown) for capturing digital images.

Inasmuch as the systems and methods described herein were developed in the context of a mobile computing system 100, the remaining discussion is based on a mobile computing environment. However, the discussion of the various systems and methods in relation to a mobile computing environment should not be construed as a limitation as to the applicability of the systems and methods described herein to just mobile computing environments.

In accordance with at least some embodiments of the invention, many of the components illustrated in FIG. 1, while possibly available as individual integrated circuits, are preferably integrated or constructed onto a single semiconductor die. Thus, the MPU 10, digital signal processor 16, memory controller 22 and RAM 24, along with some or all of the remaining components, are preferably integrated onto a single die, and thus may be integrated into a computing device 100 as a single packaged component. Having multiple devices integrated onto a single die, especially devices comprising a multiprocessor unit 10 and RAM 24, may be referred to as a system-on-a-chip (SoC) or a megacell 44. While using a system-on-a-chip may be preferred, obtaining the benefits of the systems and methods as described herein does not require the use of a system-on-a-chip.

Figure 2:
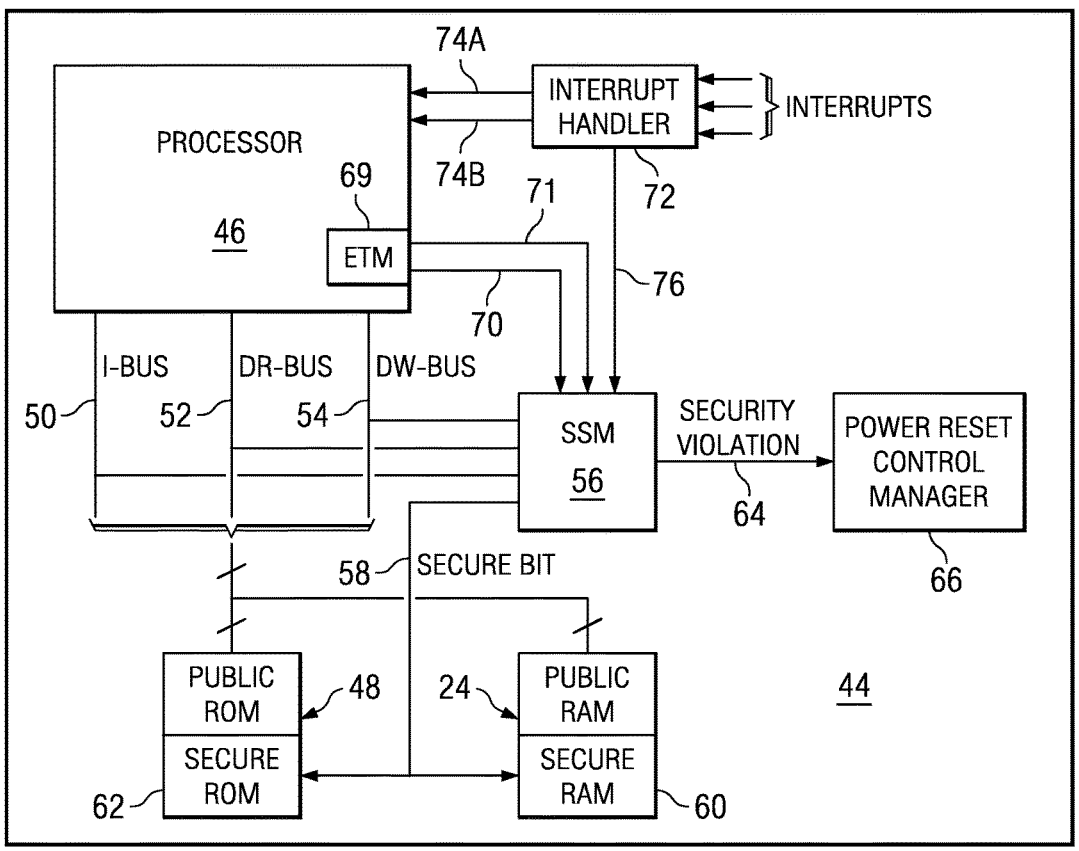
FIG. 2 illustrates a portion of the megacell of FIG. 1 in greater detail, and in accordance with embodiments of the invention.

FIG. 2 shows a portion of the megacell 44 in greater detail. The processor 46 may couple to the RAM 24 and ROM 48 by way of an instruction bus 50, a data read bus 52 and a data write bus 54. The Instruction bus 50 may be used by the processor 46 to fetch instructions for execution from one or both of the RAM 24 and ROM 48. Data read bus 52 may be the bus across which data reads from RAM 24 propagate. Likewise, data writes from the processor 46 may propagate along data write bus 54 to the RAM 24.

The security state machine 56 in accordance with embodiments of the invention controls the entry into, execution during, and exiting from the secure mode. The security state machine 56 is preferably a hardware based state machine that monitors various signals within the computing system 100 (e.g., instructions on the instruction bus 50, data writes on the data write bus 52 and data reads on the data read bus 54), and when a proper sequence of signals is noted, the security state machine 56 asserts a secure bit 58. The secure bit 58 may be coupled to the secure portions of the RAM and ROM, in particular the secure RAM 60 and the secure ROM 62. An asserted secure bit 58 thus allows access by the processor 46 to the trusted programs stored within the secure RAM 60 and secure ROM 62. Further when the secure bit is asserted, the processor 46 also may access secure data within the secure RAM 60.

Once in the secure mode, the security state machine 56 continues to monitor one or more of the instruction bus 50, the data read bus 52 and the data write bus 54 to ensure that application threads executing within the processor 46 do not attempt to load and execute programs stored outside the secure RAM 60 and secure ROM 62. In the event an application thread within the processor 46 is corrupted and attempts to access a non-secure program and/or perform an operation on data that is not allowed in the secure mode (e.g., "buffer overflow attacks"), the security state machine 56 may assert a security violation signal 64 to the power reset control manager 66. The power reset control manager 66 may reset the entire computing system 100 in response to the violation. For more detailed description of the secure mode of operation, the signals that may be monitored to make the decision as to whether to enter the secure mode, and the state diagram for operation of the security state machine, reference may be had to United States Patent Application Publication No. 2003/0140245A1, published Jul. 24, 2003, which is assigned to the same Assignee as the present specification, and which is also incorporated by reference herein as if reproduced in full below.

Since processor 46 of the preferred embodiments has several pipelines, to ensure that no malicious programs are within the pipelines, it may be necessary to flush the pipelines as part of the process of preparing the computing system for the secure mode. For example, in order to flush the various pipelines of the processor 46, a series of No OPeration Instructions (NOPs) may be sent to the processor 46 over the Instruction bus 50 and thereafter executed. Sixteen NOPs are sufficient to clear the eight stages of the pipeline of the preferred ARM1136 processor core. The ARM1136 technology may be obtained from ARM Holdings plc of Cambridge, United Kingdom, and/or ARM, Inc. of Austin, Tex., USA. Greater or fewer NOPs may be used depending on type of processor core used and the number of pipeline stages actually implemented. After execution of sixteen NOPs, the processor's pipelines may be filled with trusted instructions.

The next step in entering the secure mode may be establishing a "memory barrier." A memory barrier in accordance with embodiments of the invention means that when entering the secure mode, no data and/or instructions remain in any of the caches or buffers within the processor, as the data and/or instructions are non-secure and may be corrupted. In particular, instructions of non-secure programs may remain in the instruction prefetch buffer and branch prediction cache. Write instructions may remain in the write buffer. In accordance with embodiments of the Invention utilizing an ARM1136 processor 46, the following instructions, illustrated in assembly language, may be used to flush the Instruction prefetch buffer:

MOV R0, #0

MCR p15, 0, R0, c7, c5, 4       (1)

Some processors, including the ARM1136, may have program flow branch prediction that may need to be disabled as part of the secure mode entry sequence. Thus, the following assembly language may be executed to disable program flow prediction.

MOV R0, #Zvalue

MCR cp15, 0, R0, c1, c0, 0       (2)

In the preferred ARM1136, deactivation of the program flow prediction merely stops program flow prediction, but does not flush the branch prediction cache. The following assembly language code may be used to flush the branch prediction cache.

MOV R0, #0

MCR p15, 0, R0, c7, c5, 6       (3)

To complete the memory barrier, it may be necessary to drain the write buffer of the processor 46, possibly by executing the following assembly language code.

MOV R0, #0

MCR p15, 0,R0,c7,c10,4       (4)

The above exemplary assembly language routines to perform data cache flushing, disabling of branch prediction, flushing of the branch prediction cache, and write buffer draining are merely exemplary for the ARM1136 processor. Other similar operations may be performed for different processors, and thus the examples should not be construed as limiting as to the precise nature of the instructions executed to implement the memory barrier.

As can be appreciated from the description above relating to the number of NOPs that execute to perform the pipeline flush, as well as the various assembly language routines to execute the memory barrier, several actions need to take place to ensure that no malicious programs remain within the processor pipelines, caches or buffers. The security state machine 56, acting as a monitoring device, may ensure that the various instructions for the secure mode entry sequence are properly fetched and enter the processor 46 by monitoring at least the instruction bus 50; however, ensuring that the instructions enter the processor does not necessarily ensure that the instructions are actually executed in the processor 46.

In accordance with embodiments of the invention, the security state machine 56 ensures proper execution of the secure mode entry sequence by monitoring activity within the processor. Monitoring may take place, for example, over a trace port, such as an embedded trace macrocell (ETM) port 69 of the processor. While an ARM1136 core is the preferred processor 46, any processor core that has a trace port may be utilized. Most microprocessors produced as of the writing of this specification, including microprocessors designed and manufactured by Intel, have a trace port and thus may be utilized in the embodiments of the invention.

An ETM port on a processor allows programmers to debug programs by monitoring the status of an executed instruction. In particular, an ETM port comprises an address bus 70 providing the address of the last executed instruction, as well as an interface bus 71 providing information as to the state of the processor during the last executed instruction. For the exemplary ARM1136 core, the ETM port signals ETMIA[31:0] are the address bus 70 providing the last executed instruction address, and the signals ETMIACTL [17:0] are the interface bus 71 providing at least some of the state signals. The security state machine 56 monitors these signals to ensure that instructions that enter the processor over the instruction bus 50 are properly executed. The following paragraphs describe the parameters monitored by the security state machine in accordance with embodiments of the invention.

Many processor cores 46, including the preferred ARM1136, have the capability to execute multiple types of instruction sets. For example, the ARM1136 core implements a 32 bit ARM instruction set, a 16 bit Thumb instruction set (being a reduced set of the 32 bit ARM instruction set), and a Java® instruction set. A series of instructions from a first instruction set presented to the processor while it is configured to execute a different instruction set will not be properly executed. Thus, in accordance with at least some embodiments of the invention, the security state machine 56 not only verifies that each secure mode entry sequence instruction is executed by the processor, but also that the processor was configured for the proper instruction set during the execution. For the exemplary ARM1136, the security state machine 56 verifies which instruction was executed by verifying the instruction's address on ETM port 69 signals ETMIA[31:0] and ensures the processor was in the preferred 32 bit ARM instruction set mode during the executing by monitoring the ETMIACTL[4] (asserted when Java enabled) and ETMIACTL[3] (asserted when Thumb enabled) signals.

Referring again to FIG. 2, one aspect of the secure mode entry sequence is to disable external interrupts to the processor 46. In particular, interrupt handler 72 receives interrupts from various system components, and multiplexes the interrupts to the available interrupt lines 74 of the processor. The security state machine couples to the Interrupt handler 72, by way of signal line 76, and thus may monitor whether the interrupt handler is configured to transfer interrupts, or whether the interrupt handler is configured to mask all interrupts. While masking external interrupts to the processor may ensure the entry sequence is not externally interrupted by malicious programs, some processor cores, including the preferred ARM1136, have internal interrupts and exceptions. Thus, in accordance with embodiments of the invention, the security state machine 56, using signal lines of the ETM port 69, verifies that no internal interrupts or exceptions occur during the execution of each entry sequence instruction. In particular, for an exemplary ARM1136 as the processor 46, the security state machine 56 may monitor: ETMIACTL[11] (asserted when the instruction executed is an exception vector); ETMIACTL[15] (asserted when the previous instruction has been cancelled by an exception); and ETMIACTL[14:12] (code that indicates the type of exception encountered). In the event a processor 46 internal interrupt or exception occurs, proper operation of the secure mode entry sequence may have been compromised, and thus the security state machine 56 asserts the security violation signal 64 to the power reset control manager 66.

Even if the processor 46 is neither interrupted nor experiences an internal exception during execution of the secure mode entry sequence instruction, the processor 46 may still fail to execute the instruction by the occurrence of an abort. Many mechanisms within a processor may generate aborts. In the preferred ARM1136 processor, ARM instructions, the various pipelines stages, the branch flow prediction mechanism, the memory management unit and the debug circuitry are all capable of generating aborts. Malicious programs may enter and be executed if portions of the secure mode entry sequence are aborted, and thus not executed. Thus, in accordance with embodiments of the invention, the security state machine 56 monitors the processor 46 for unexpected aborts during the secure mode entry sequence, preferably by monitoring one or more of the signals emanating from the ETM port 69. For the exemplary ARM1136 acting as processor 46, the security state machine 56 monitors the ETMIACTL [17:0] signals and the ETMDDCTL [3:0] signals for instruction and/or data transfer aborts. More particularly, for an exemplary ARM1136 the security state machine 56 may monitor: ETMIACTL[17], which is asserted when an outstanding slot (i.e., a slot data that impacts an instruction immediately following the current instruction) is killed; ETMIACTL[16], which is asserted when an instruction/data abort occurs; ETMIACTL[10], which is asserted when a data slot associated with coprocessor instructions are killed when doing a bounce operation, wherein the bounce operation is used to prevent the unexpected writing of data into the coprocessor. Further, the security state machine 56 may also monitor: ETMDDCTL [3], which is asserted when a data abort occurs where data in a data transfer is ignored; and ETMDDCTL[2], which is asserted when store-exclusive ("STREX") data writes fail.

In addition to verifying that no instruction and/or data aborts occur during the secure mode entry sequence, the security state machine 56 also verifies the type of instruction executed. In particular, a processor 46 with branch prediction and speculative branch execution may speculatively execute a code-path. ETM port 69 may provide information as to whether the instruction most recently executed was a real or speculatively executed instruction (also known as a phantom), whether the instruction failed its condition code, and whether the instruction was an indirect branch. For the exemplary ARM1136 acting as processor 46, the security state machine 56 may thus monitor the following signals: ETMIACTL[7], which is asserted when the instruction executed was an Indirect branch; ETMIACTL[6], which is asserted when a phantom instruction failed its condition; ETMIACTL[5], which is asserted when a non-phantom instruction failed its condition; ETMIACRTL[2], which is asserted when a branch phantom executed; and ETMIACTL [1], which is asserted when a non-phantom instruction executed. As discussed above, the branch prediction and speculative execution are preferably disabled as part of the secure mode entry sequence, and thus assertion of any of the ETMIACTL[6] or [2] signals is indicative of a failure to properly disable these features.

Figure 3:
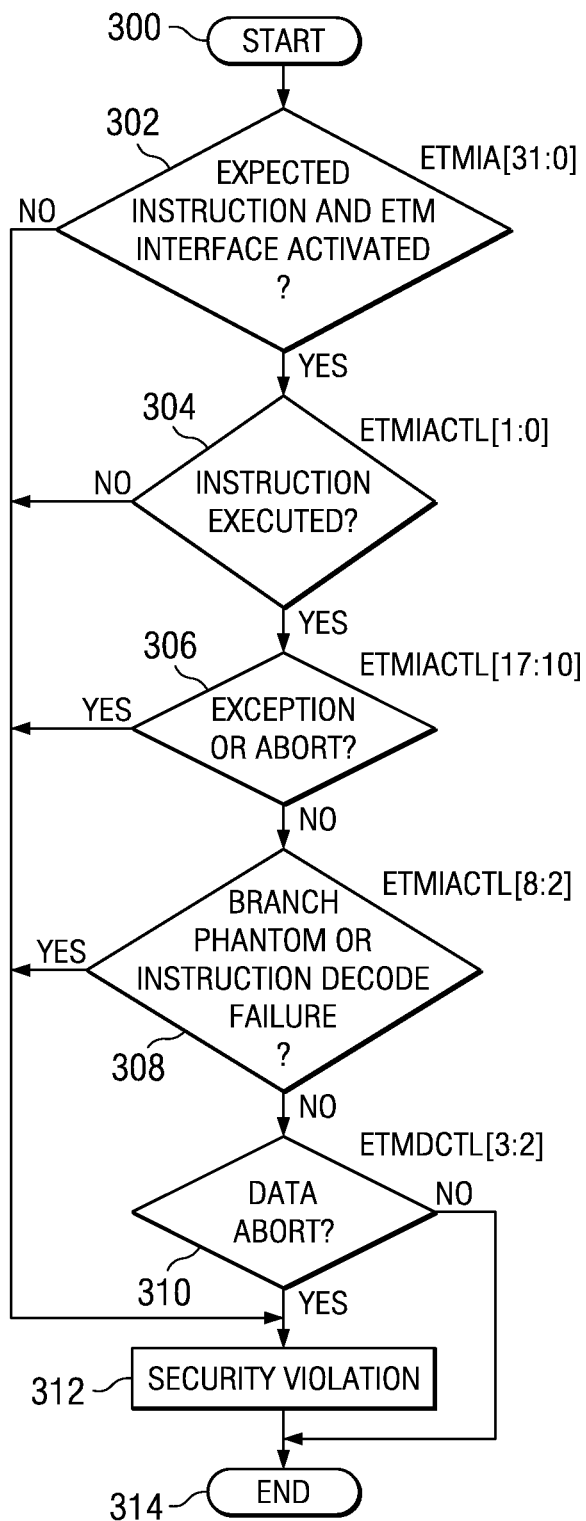
FIG. 3 illustrates a flow diagram of an exemplary method in accordance with embodiments of the invention.

FIG. 3 illustrates a method that may be implemented in accordance with embodiments of the invention. In particular, for each instruction of the secure mode entry sequence, including the NOPs and the various instructions illustrated in assembly language above, the security state machine 56 monitors execution within the processor 46 using the ETM port 69. The process may start (block 300) and proceed to a determination of whether an ETM interface is active and whether the last instruction operated upon by the processor 46 was an instruction that the security state machine 56 expected (block 302). For the preferred ARM1136 as the processor 46, the determination of whether the last instruction was expected may be made by verifying the address of the instruction executed ETM port 69 signals ETMIA[31:0], noted proximate to decision block 302. In the remaining discussion, the specific signals that may be monitored to implement the verification process for an exemplary ARM1136 are presented. However, this discussion should not be construed as a limitation of the applicability of the methods described to just ARM1136 processors.

If the instruction operated upon was the expected instruction, the next step in the process may be a determination of whether the Instruction was executed (block 304), possibly by monitoring the ETM port 69 signals ETMIACTL[1:0]. If the ETM port 69 indicates the instruction was executed, the next step may be a determination of whether the processor experienced an Internal exception or an instruction/data abort (block 306), possibly by monitoring the ETM port 69 signals ETMIACTL[17:10]. If no exceptions or aborts occur, the next step may be a determination of whether the Instruction was a branch phantom, or whether there was a decode error associated with the Instruction (block 308), possibly by monitoring the ETM port 69 signals ETMIACTL[8:2]. If the instruction was not a branch phantom, and no decode errors occurred, the next step may be a determination of whether there was a transfer/data abort (block 310), possibly by monitoring the ETM port 68 signals ETMDDCTL[3:2].

Still referring to FIG. 3, if any of the determinations of blocks 302-310 indicate an unexpected value, or a value indicative of the failed proper execution of the secure mode entry sequence instruction, the process moves to a security violation state (block 312), in which state the security state machine 56 may assert the security violation signal to the power reset control manager 66 (FIG. 2), and the process may end (block 314). If the instruction was properly executed, the process may end (block 314). The method illustrated in FIG. 3 need not necessarily be performed in the precise order shown. Moreover, the method may be performed for each secure mode entry sequence instruction, and a failure to properly execute any such instruction may be indicative of an attempt of a malicious program to execute in the secure mode, thus having access to secure data.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   delivering, by an instructions bus, an instruction from a memory to a processor;
   attempting to execute the instruction, by the processor; and
   allowing, by a monitoring circuit, the processor to enter into a secure mode of operation, in response to confirming, by the monitoring circuit, proper execution of the instruction by the processor, wherein confirming the proper execution of the instruction by the processor comprises checking an interface bus of a trace port of the processor to determine that the processor identified the instruction as not a speculatively executed instruction.

2. The method of claim 1, wherein confirming proper execution of the instruction by the processor further comprises checking the interface bus of the trace port of the processor to determine that an instruction set mode of the processor is the same as an instruction set type of the instruction.

3. The method of claim 1, wherein confirming proper execution of the instruction by the processor further comprises checking the interface bus of the trace port of the processor to determine that the processor did not experience an internal exception while attempting to execute the instruction.

4. The method of claim 1, wherein confirming proper execution of the instruction by the processor further comprises checking the interface bus of the trace port of the processor to determine that the processor did not experience an abort while attempting to execute the instruction.

5. The method of claim 1, wherein the memory, the processor, and the monitoring circuit are on a system-on-a-chip (SoC).

6. The method of claim 1, wherein the secure mode of operation is different than privilege modes of the processor.

7. The method of claim 1, wherein allowing the processor to enter into the secure mode of operation comprises asserting a secure bit.

8. The method of claim 1, further comprising flushing pipelines of the processor, in response to the monitoring circuit allowing entry of the processor into the secure mode of operation, before entering the secure mode of operation.

9. The method of claim 8, wherein flushing the pipelines of the processor comprises sending sixteen no operation instructions (NOPs) to the processor over the instruction bus.

10. The method of claim 1, further comprising flushing an instruction prefetch buffer of the processor, in response to the monitoring circuit allowing entry of the processor into the secure mode of operation, before entering the secure mode of operation.

11. The method of claim 1, further comprising flushing branch prediction cache, in response to the monitoring circuit allowing entry of the processor into the secure mode of operation, before entering the secure mode of operation.

12. The method of claim 1, further comprising draining a write buffer of the processor, in response to the monitoring circuit allowing entry of the processor into the secure mode of operation, before entering the secure mode of operation.

13. The method of claim 1, wherein confirming proper execution of the instruction by the processor further comprises verifying, by the monitoring circuit, an address of the instruction on an address bus of the trace port of the processor.

14. An apparatus comprising:
    a memory;
    a processor coupled to the memory by an instruction bus, the processor having a trace port having an address bus and an interface bus, the processor configured to:
        receive an instruction from the memory over the instruction bus; and
        attempt to execute the instruction; and
    a monitoring circuit coupled to the processor by the address bus of the trace port, wherein the monitoring circuit is configured to allow the processor to enter into a secure mode of operation, in response to determining proper execution of the instruction by the processor, wherein determining proper execution of the instruction comprises determining, using the interface bus of the trace port, that the processor identified the instruction as not a speculatively executed instruction.

15. The apparatus of claim 14, wherein the monitoring circuit is a hardware-based security state machine.

16. The apparatus of claim 14, wherein the monitoring circuit determining proper execution of the instruction comprises determining, using the interface bus of the trace port, that the processor has not experienced an internal exception while the processor attempts to execute the instruction.

17. The apparatus of claim 14 wherein the monitoring circuit checks the interface bus of the trace port to determine whether the processor experienced an abort while attempting to execute the instruction.

18. The apparatus of claim 14, wherein the processor, the memory, and the monitoring circuit are integrated on a single die.

19. The apparatus of claim 18, wherein the single die further comprises a power reset control manager.

20. The apparatus of claim 18, wherein the single die further comprises a digital signal processor (DSP), a graphics accelerator, a camera interface, a memory controller, and a universal serial bus (USB) interface.

21. The apparatus of claim 14, wherein the monitoring circuit issues a security violation signal to a power reset control manager, in response to determining improper execution of the instruction.

22. The apparatus of claim 14, wherein the monitoring circuit determining proper execution of the instruction by the processor further comprises determining that the instruction was executed by the processor.

23. The apparatus of claim 14, wherein the monitoring circuit further issues a security violation signal, in response to determining that the instruction was not executed.

24. The apparatus of claim 14, wherein the monitoring circuit determining proper execution of the instruction by the processor further comprises determining that the processor has not experienced an internal exception during execution of the instruction.

25. The apparatus of claim 14, wherein the monitoring circuit further issues a security violation signal, in response to determining that the processor experienced an internal exception during execution of the instruction.

26. The apparatus of claim 14, wherein the monitoring circuit determining proper execution of the instruction by the processor further comprises determining that the processor has not experienced an abort during execution of the instruction.

27. The apparatus of claim 14, wherein the monitoring circuit further issues a security violation signal in response to determining that the processor experienced an abort during execution of the instruction.

28. The apparatus of claim 14, wherein the monitoring circuit determining proper execution of the instruction by the processor further comprises determining that the instruction is not a branch phantom or the instruction is not associated with decode errors.

29. The apparatus of claim 14, wherein the monitoring circuit further issues a security violation signal, in response to determining that the instruction is a branch phantom.

30. The apparatus of claim 14, wherein the monitoring circuit determining proper execution of the instruction by the processor further comprises determining that the instruction is not associated with decode errors.

31. The apparatus of claim 14, wherein the monitoring circuit further issues a security violation signal, in response to determining that the instruction is associated with decode errors.

32. The apparatus of claim 14, wherein the monitoring circuit determining proper execution of the instruction by the processor further comprises determining that the processor has not experienced a transfer/data abort during execution of the instruction.

33. The apparatus of claim 32, wherein the monitoring circuit further checks the interface bus of the trace port to determine that the processor did not experience the transfer/data abort during execution of the instruction.

34. The apparatus of claim 14, wherein the monitoring circuit further issues a security violation signal in response to determining that the processor experienced a transfer/data abort during execution of the instruction.

35. The apparatus of claim 14, wherein the trace port of the processor is an embedded trace macrocell (ETM) interface.

36. The apparatus of claim 14, wherein confirming proper execution of the instruction by the processor further comprises verifying, by the monitoring circuit, an address of the instruction on the address bus of the trace port of the processor.

37. A method comprising:
delivering, by an instruction bus, an instruction from a memory to a processor;
attempting to execute the delivered instruction, by the processor; and
preventing, by a monitoring circuit, the processor from entering a secure mode of operation, in response to determining that the delivered instruction is a speculatively executed instruction, using a trace port of the processor.

38. The method of claim 37, further comprising checking an address bus of the trace port of the processor.

39. The method of claim 37, further comprising checking an interface bus of the trace port of the processor.

40. The method of claim 37, further comprising checking an interface bus of the trace port to determine whether the processor experienced an internal exception during execution of the delivered instruction.

41. The method of claim 37, further comprising checking an interface bus of the trace port to determine whether the processor experienced an abort while attempting to execute the delivered instruction.

42. The method of claim 37, wherein the memory, the processor, and the monitoring circuit are on a system-on-a-chip (SoC).

43. The method of claim 37, wherein preventing the processor from entering the secure mode of operation comprises de-asserting a secure bit.

44. An apparatus comprising:
a memory;
a processor coupled to the memory by an instruction bus, the processor having a trace port having an address bus, the processor configured to:
receive an instruction from the memory over the instruction bus; and
attempt to execute the received instruction; and
a monitoring circuit coupled to the processor by the address bus of the trace port, wherein the monitoring circuit is configured to prevent the processor from entering into a secure mode of operation, in response to determining that the processor identified the received instruction as a speculatively executed instruction.

45. The apparatus of claim 44, wherein the monitoring circuit is a hardware-based security state machine.

46. The apparatus of claim 44, wherein the monitoring circuit prevents the processor from entering into the secure mode of operation by issuing a security violation signal.

47. The apparatus of claim 44, wherein the apparatus is a system-on-a-chip (SoC).

* * * * *